(12) United States Patent
Wagener et al.

(10) Patent No.: US 9,091,817 B2
(45) Date of Patent: Jul. 28, 2015

(54) ASYMMETRIC LENSLET ARRAY

(75) Inventors: Jefferson L. Wagener, Morristown, NJ (US); Mitchell E. Haller, Marlboro, NJ (US)

(73) Assignee: Nistica, Inc., Bridgewater, NJ (US)

( * ) Notice: Subject to any disclaimer, the term of this patent is extended or adjusted under 35 U.S.C. 154(b) by 138 days.

(21) Appl. No.: 13/593,870

(22) Filed: Aug. 24, 2012

(65) Prior Publication Data

US 2013/0051726 A1 Feb. 28, 2013

Related U.S. Application Data (60) Provisional application No. 61/526,791, filed on Aug. 24, 2011.

(51) Int. Cl.
  *G02B 6/32* (2006.01)
  *G02B 6/35* (2006.01)
  *G02B 3/00* (2006.01)
  G02B 6/293 (2006.01)

(52) U.S. Cl.
  CPC ............... *G02B 6/32* (2013.01); *G02B 3/0068* (2013.01); *G02B 6/3512* (2013.01); *G02B 6/29311* (2013.01); *G02B 6/356* (2013.01); *G02B 6/3552* (2013.01)

(58) Field of Classification Search
  None
  See application file for complete search history.

(56) References Cited

U.S. PATENT DOCUMENTS

| | | | |
|---|---|---|---|
| 5,412,506 A | 5/1995 | Feldblum et al. | |
| 5,742,720 A * | 4/1998 | Kobayashi et al. | 385/89 |
| 6,078,708 A * | 6/2000 | de la Tocnay et al. | 385/33 |
| 6,339,503 B1 * | 1/2002 | Derstine et al. | 359/622 |
| 6,430,328 B1 | 8/2002 | Culver et al. | |
| 6,618,517 B2 * | 9/2003 | Ducellier et al. | 385/17 |
| 6,768,834 B1 * | 7/2004 | Gruhlke | 385/24 |
| 6,956,687 B2 | 10/2005 | Moon et al. | |
| 7,004,645 B2 * | 2/2006 | Lemoff et al. | 385/89 |
| 7,092,599 B2 | 8/2006 | Frisken | |
| 7,123,833 B2 | 10/2006 | Szczepanek et al. | |
| 7,126,740 B2 | 10/2006 | Szczepanek et al. | |
| 7,231,106 B2 * | 6/2007 | Basavanhally et al. | 385/18 |
| 7,397,980 B2 | 7/2008 | Frisken | |
| 7,764,428 B2 * | 7/2010 | Hayashi et al. | 359/619 |
| 2002/0031301 A1 * | 3/2002 | Sasaki et al. | 385/34 |
| 2002/0097957 A1 * | 7/2002 | Kikuchi et al. | 385/33 |
| 2002/0186922 A1 * | 12/2002 | Hananaka | 385/33 |
| 2002/0196520 A1 | 12/2002 | Marom et al. | |
| 2003/0002783 A1 * | 1/2003 | Neilson et al. | 385/18 |
| 2003/0002789 A1 * | 1/2003 | Boye et al. | 385/31 |

(Continued)

FOREIGN PATENT DOCUMENTS

| EP | 1281991 | 5/2003 |
|---|---|---|
| JP | 10-142458 A * | 5/1998 |

OTHER PUBLICATIONS

European Search Report from corresponding EP application No. 12006027.2-1234 dated Jan. 9, 2013, 6 pages.

*Primary Examiner* — Mike Stahl
(74) *Attorney, Agent, or Firm* — Stuart H. Mayer; Mayer & Williams PC (57) ABSTRACT

An optical launch arrangement includes a fiber assembly for securing an array of optical fibers. The optical launch arrangement also includes an asymmetric lenslet array having a first surface with a pair of coupling lenses in registration with each optical fiber in the array of optical fibers and a second surface with a collimating lens in registration with each pair of coupling lenses.

23 Claims, 10 Drawing Sheets

(56) References Cited

U.S. PATENT DOCUMENTS

| | | |
|---|---|---|
| 2003/0012486 A1 | 1/2003 | Ducellier et al. |
| 2003/0231829 A1* | 12/2003 | Meyers et al. ............ 385/33 |
| 2005/0008283 A1 | 1/2005 | Brophy et al. |
| 2005/0063643 A1* | 3/2005 | Watanabe et al. ........ 385/33 |
| 2006/0165351 A1* | 7/2006 | Hamanaka et al. ........ 385/33 |
| 2007/0127326 A1* | 6/2007 | Nakajima ............ 369/44.15 |
| 2007/0258678 A1 | 11/2007 | Terada et al. |
| 2008/0193082 A1* | 8/2008 | Hamada ..................... 385/33 |
| 2013/0064507 A1* | 3/2013 | Mahnkopf et al. ........ 385/52 |
| 2013/0084039 A1* | 4/2013 | Doany et al. .............. 385/33 |

\* cited by examiner

Figure 4:
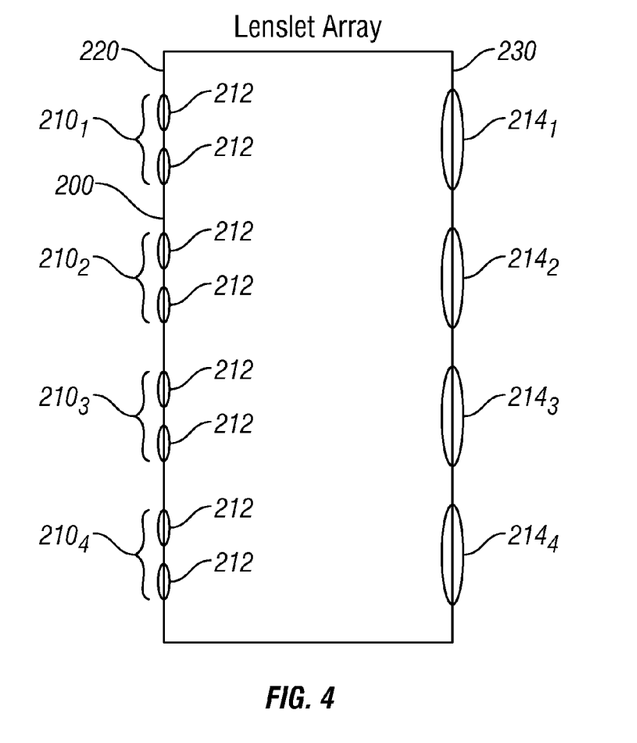
FIG. 4 shows a plan view of one example of an asymmetric lenslet array.

are formed on outer surface 230 of the lenslet array 200. Each pair 210 of coupling lenses 212 is
ASYMMETRIC LENSLET ARRAY

STATEMENT OF RELATED APPLICATIONS

This application claims the benefit of U.S. Provisional Patent Application Ser. No. 61/526,791, filed Aug. 24, 2011, entitled "ASYMMETRIC LENSLET ARRAY," the entire disclosure of which is incorporated by reference in its entirety herein.

BACKGROUND

Figure 1:
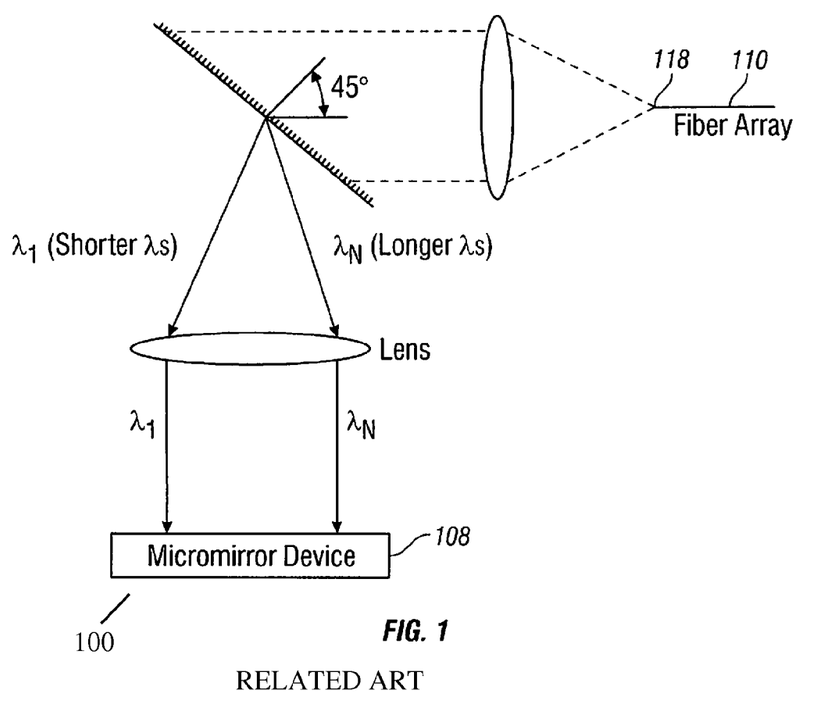
FIG. 1 shows a simplified example of a wavelength blocker that is based on a MEMs mirror array such as a DMD.

Many optical fabrics direct an incoming and outgoing optical beam along the same optical path. Such optical fabrics may include optical switches, waveblockers and optical attenuators. FIG. 1 shows a simplified example of a wavelength blocker 100 that is based on a MEMs (micro electromechanical system) mirror array such as a DMD (digital micromirror device) 108. In a 1×1 wavelength blocker the fiber array 110 is a single fiber that serves as an input and output port. Often a circulator (not shown) or other means are used to separate the incoming and outgoing beams. If the fiber array 110 includes N fibers, then each fiber serves as an input and output port. Such a device provides N 1×1 wavelength blockers using a common optical fabric and is referred to as a wavelength blocker array. In such a device the launch optics would generally require the fiber array 110 and a series of circulators or the like to separate each of the N incoming beams and the N outgoing beams.

It would be desirable to provide a launch optics arrangement that is less complex and costly for use with an optical fabric such as the wavelength blocker array described above.

SUMMARY

In accordance with one aspect of the invention an optical launch arrangement is provided which includes a fiber assembly for securing an array of optical fibers. The optical launch arrangement also includes an asymmetric lenslet array having a first surface with a pair of coupling lenses in registration with each optical fiber in the array of optical fibers and a second surface with a collimating lens in registration with each pair of coupling lenses.

In accordance with another aspect of the invention, an optical switch includes a fiber assembly for securing an array of optical fibers and an asymmetric lenslet array having a first surface with a pair of coupling lenses in registration with each optical fiber in the array of optical fibers and a second surface with a combining lens in registration with each pair of coupling lenses. The optical switch also includes a MEMs mirror array. Each of the MEMS mirrors is positioned to receive an optical beam from one of the combining lenses.

DETAILED DESCRIPTION

Figure 2:
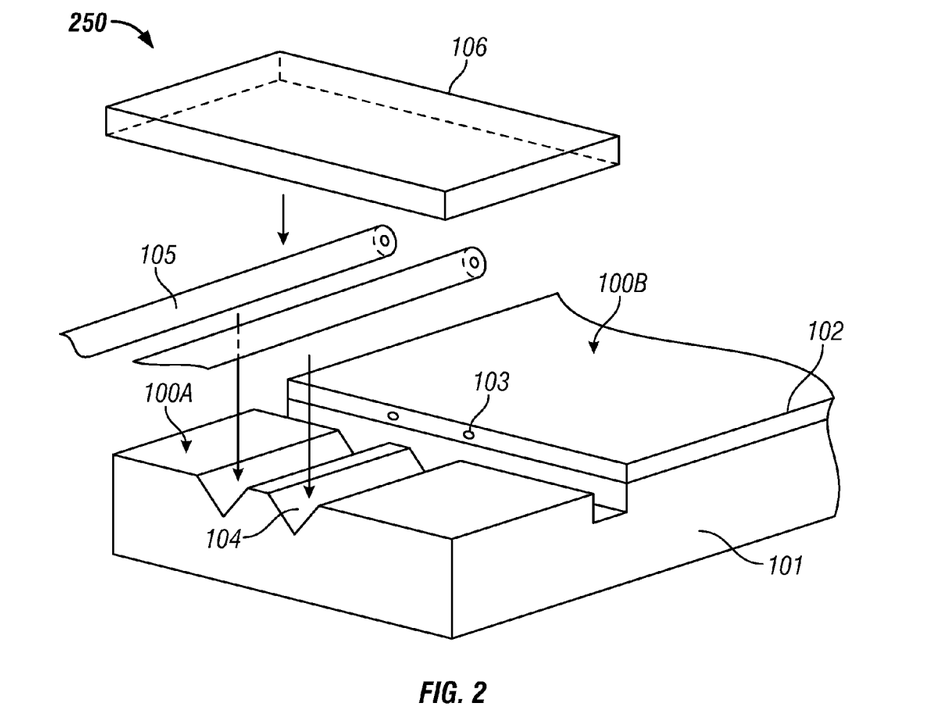
FIGS. 2 and 3A and 3B show various perspective views of a V-groove array or assembly in which a fiber array may be secured.
Figure 3A:
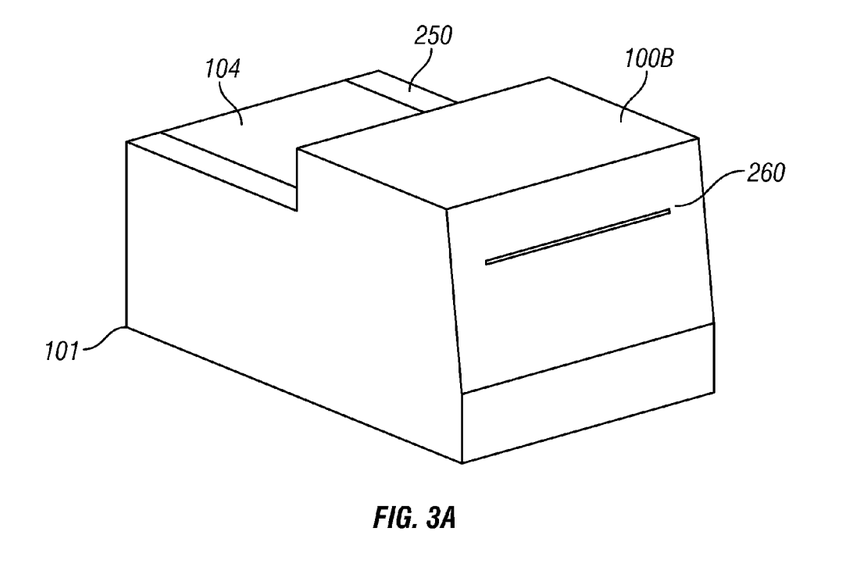
Figure 3B:
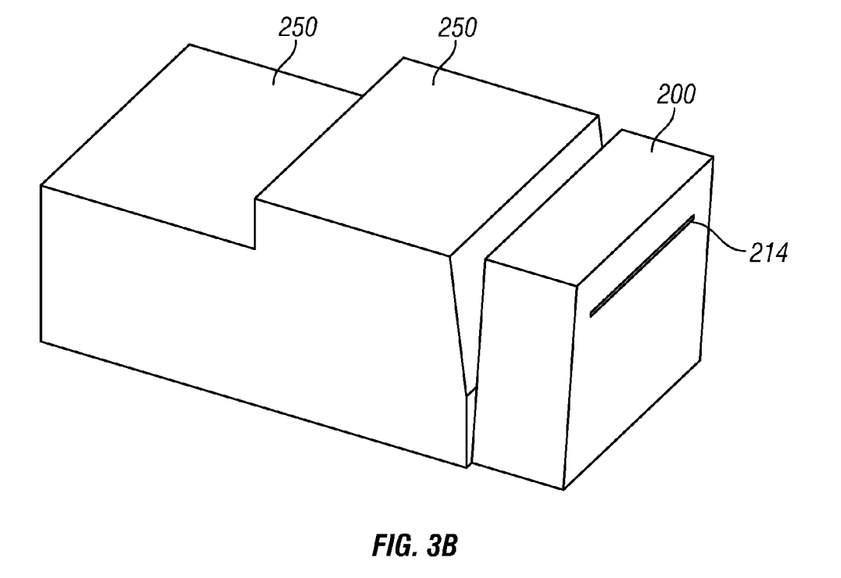

A fiber array is normally secured in a V-groove array or assembly, one example of which is shown in various perspective views in FIGS. 2 and 3A and 3B. The V-groove array 250 includes an optical waveguide unit 100B on a silicon substrate 101 and an optical fiber alignment unit 100A adjacent to the optical waveguide unit 100B. The optical waveguide unit 100B includes a cladding 102 and waveguide cores 103 formed on the silicon substrate 101. The output 260 of waveguide cores 103 is shown in FIG. 3A. The optical fiber alignment unit 100A has V-grooves 104 for securing optical fibers, and the each V-groove 104 is aligned with a waveguide core 103. Optical fibers 105 are placed in the V-grooves 104, fixing the optical fibers 105 with a glass pressure plate 106 from above, and connecting the optical fibers 105 to the cores 103.

In a conventional arrangement the collimated beams provided at the output of the V-groove array may be directed to a lenslet array having a series of coupling lens on an input surface and a corresponding series of collimating lens on an output surface. Each coupling lens is in registration with one of the collimating lenses and each coupling lens is aligned with one of the waveguide outputs in the V-groove array. While the lenslet array ensures that the collimated beams provided by the V-groove array are all parallel to one another, it does not avoid the need for circulators or the like when used as a launch optics arrangement which can separate incoming and outgoing beams.

Instead of using a symmetric lenslet array of the type described above, which is symmetric in the sense that it has the same number of coupling and collimating lenses, the V-groove array 250 can be combined with an asymmetric lenslet array to form a launch optics arrangement that is compact and relatively inexpensive to produce and does not require circulators or other optical elements. In an asymmetric lenslet array, the number of coupling lenses is different from the number of collimating lenses.

Figure 5:
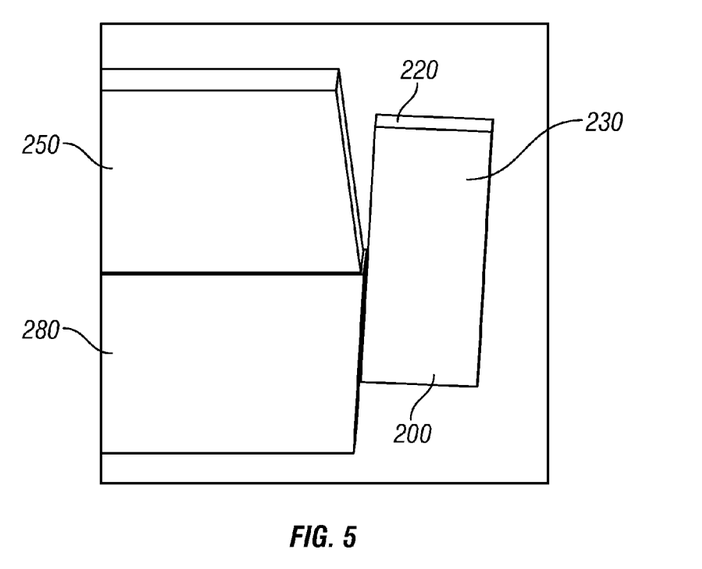
FIGS. 5-6 show a side view and a perspective view, respectively, of the V-groove array in combination with an asymmetric lenslet array to form a launch optics arrangement.
Figure 6:
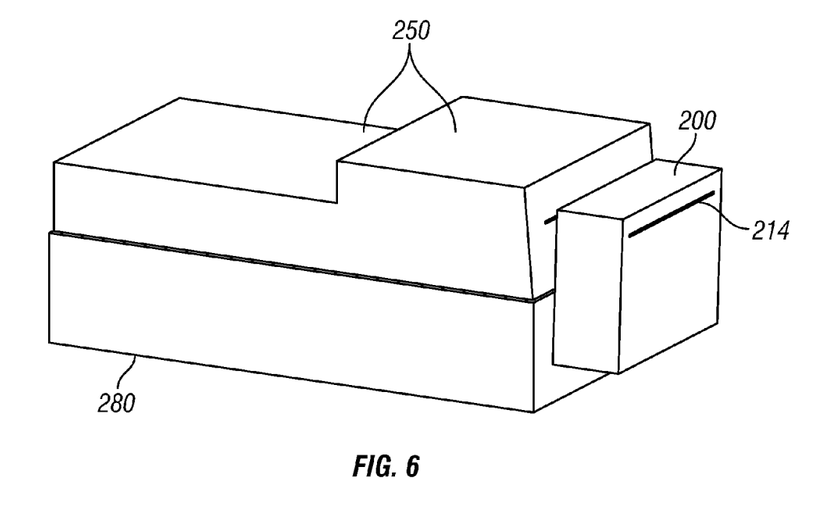

FIG. 4 shows a plan view of one example of an asymmetric lenslet array 200 and FIGS. 5-6 show a side view and a perspective view, respectively, of the V-groove array 250 in combination with the lenslet array 200. As most easily seen in FIG. 4, the lenslet array 200 includes inner and outer opposing surfaces 220 and 230 and is formed from silica or another suitably optically transparent material. A series of coupling lens pairs $210_1$, $210_2$, $210_3$ . . . are arranged on the inner surface 220 of the array 200. Likewise, a series of collimating lens $214_1$, $214_2$, $214_3$ . . . are formed on outer surface 230 of the lenslet array 200. Each pair 210 of coupling lenses 212 is in registration with one of the collimating lens 214. For example, in FIG. 4, coupling lens pair 210$_1$ is in registration with collimating lens 214$_1$ and coupling lens pair 210$_2$ is in registration with collimating lens 214$_2$. Thus, there are half as many collimating lenses 214 as coupling lenses 212. The lenses may be formed, for example, by photolithography in which a series of concave or convex surfaces are etched on the inner and outer surfaces of the lenslet array 200.

The pitch of the coupling lenses 212 is the same as the pitch of the waveguides formed in the v-groove array. Accordingly, as seen in FIGS. 5-6, the v-groove and the lenslet array can be arranged so that the coupling lens 212 of the lenslet array 200 is in registration with one of the waveguide outputs 260 of the v-groove array 250. In some particular implementations the separation between the coupling lenses 212 and the collimating lenses 214 may be about equal to the sum of their individual focal lengths.

V-groove array 250 and lenslet array 200 may be mounted on a common substrate 280. As most easily seen in FIG. 5, the inner surface 220 of the asymmetric array lenslet 200 may be angularly offset from the output surface in order to minimize back reflections. That is, the two surfaces are not parallel to one another. Likewise, an anti-reflection coating may be applied to the surfaces of the lenslet array.

In operation, a light beam from each fiber enters and exits one of the waveguide cores 103 in the V-groove array 250. The beam from each waveguide is communicated into the lenslet array 200 through one of the coupling lenses 212 and spreads out before reaching one of the collimating lenses 214. Two overlapping beams are thus incident upon each collimating lens 214. That is, a beam from each of the lenses 212 in a given coupling lens pair 210 is directed to the collimating lens 214 with which it is in registration. In this way two fibers in the fiber array secured in the V-groove array 250 effectively direct two overlapping beams coming in at slightly different angles to one of the collimating lenses 214.

The launch optics arrangement may be used as the input/output of an optical fabric such as the wavelength blocker array described above. The arrangement creates a spatially overlapped, angularly multiplexed beam that is focused at a virtual focal point (e.g., focal point 118 in FIG. 1). Since the return beam from the optical fabric comes back at a slightly different angle from the incoming beam directed to the optical fabric, one of the fibers in communication with one of the coupling lenses in a coupling lens pair can be used as an input fiber and the fiber in communication with the other coupling lens in the same coupling lens pair can be used as an output fiber.

In the simplest case, the launch optics arrangement shown herein includes a V-groove array that can accommodate two fibers and an asymmetric lenslet array having a single pair of coupling lenses in registration with a single collimating lens. Two beams that are incident upon the fibers enter the launch optics arrangement, which provides a multiplexed output beam at a virtual focus.

The coupling lenses 212 in an asymmetric lenslet array may or may not be configured the same. For instance, in some embodiments the curvature of the individual coupling lenses 212 may be spatially dependent in order to optimize various features of the optical systems in order to correct for such things as field curvature, for example. In addition, the coupling lenses 212 may provide different refractive strengths in different axes of the lenses in order to tailor asymmetric beams.

Figure 9:
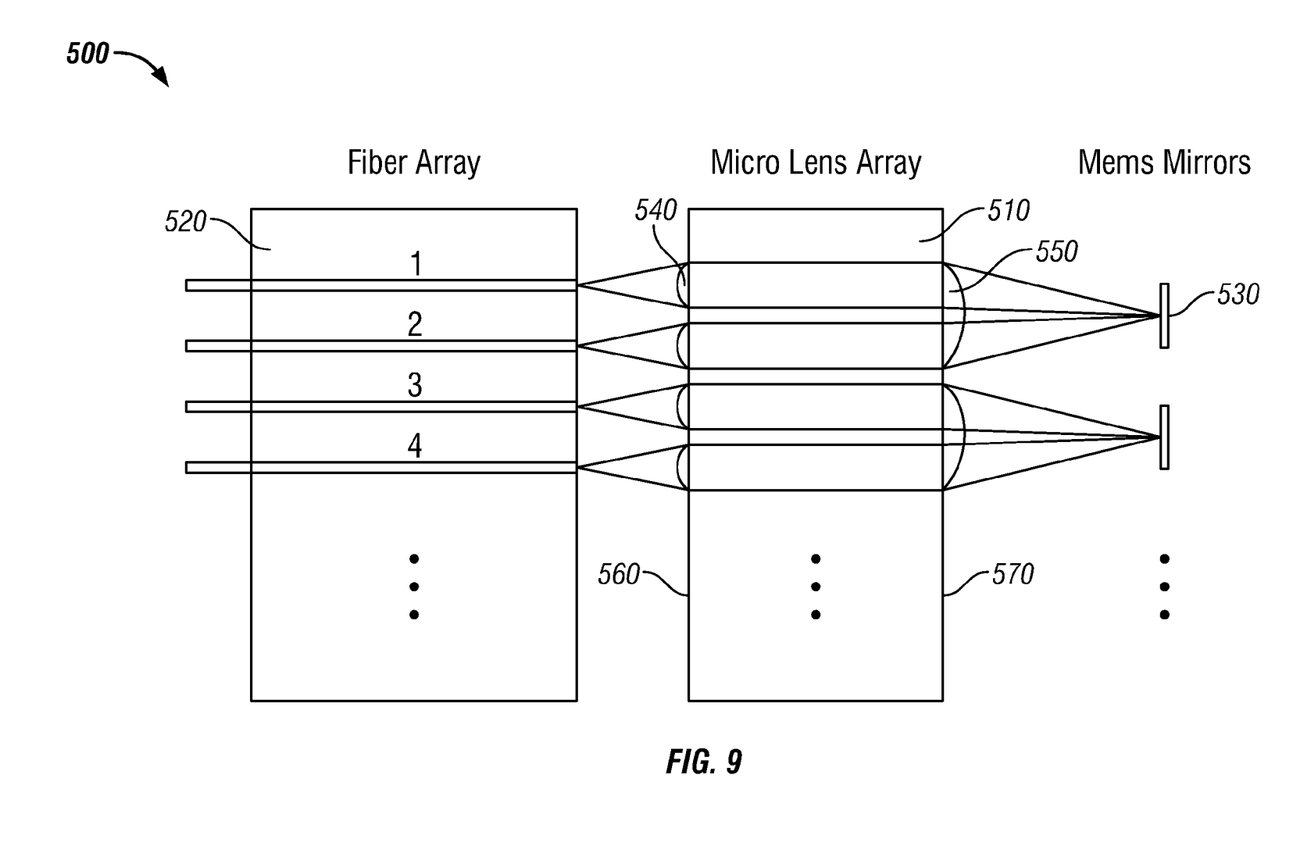
FIG. 9 shows an example of a fiber array switch which employs a micro lens array coupling element (i.e., an asymmetric lenslet array).
Figure 12:
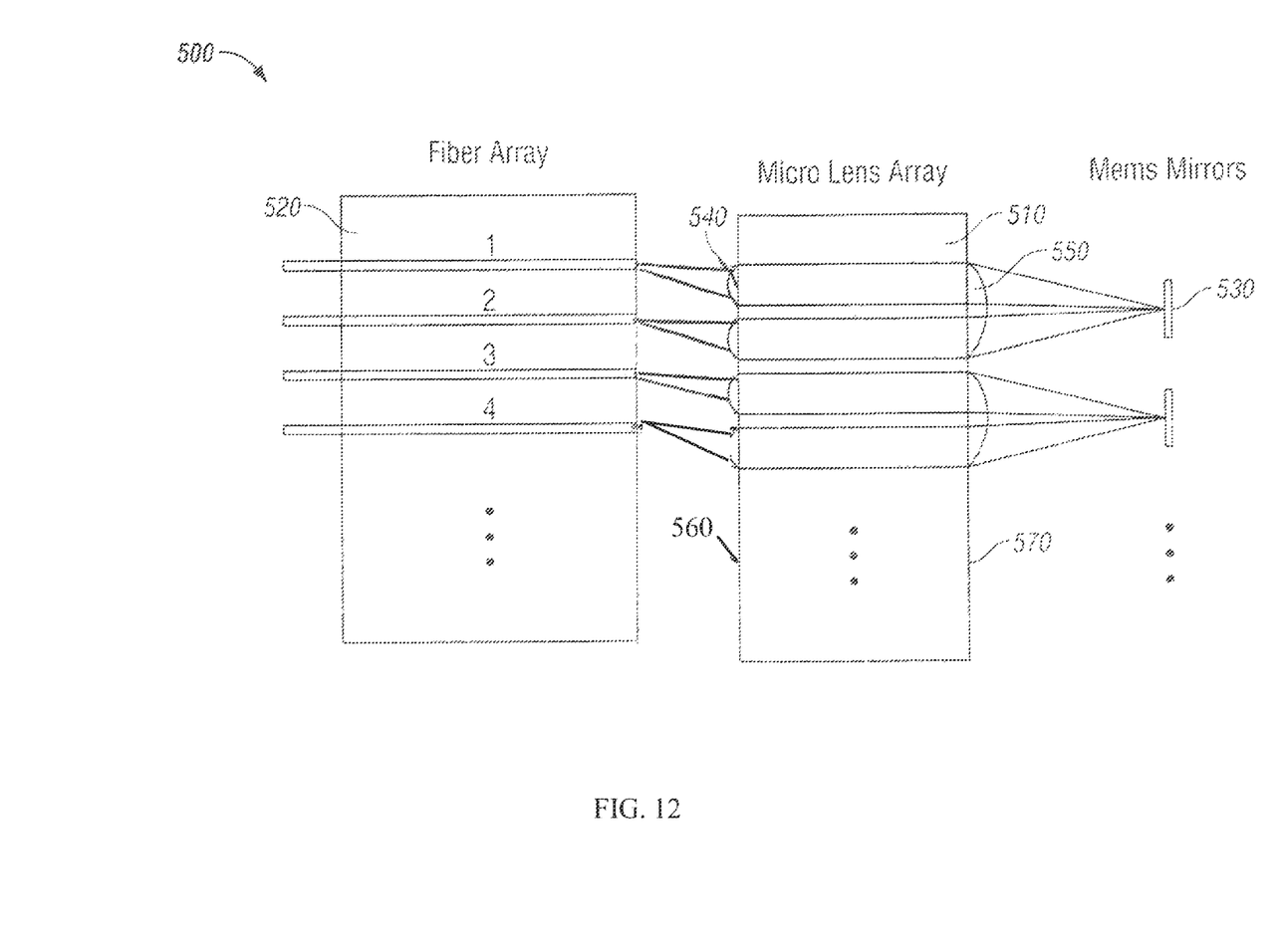
FIG. 12 shows another example of a fiber array switch similar to that shown in FIG. 9.

In another variation, the position of the coupling lenses 212 in some embodiments of the asymmetric lenslet array may not be aligned with the waveguide outputs 260 of the V-groove array. Rather, they may be offset with respect to one another in order to perform a spatial translation of the beams as they exit the asymmetric lenslet array. FIG. 12 shows such an example, which is similar to that shown in FIG. 9. In FIGS. 9 and 12 like elements are denoted by like reference numerals.

Proper alignment among the fibers in the fiber array, the waveguides 103 in the V-groove 250 and the lenses in the asymmetric lenslet array can be accomplished in a number of different ways. This process can be particularly important because the tolerance of the focal lengths of the lenses in the lenslet arrays may be too great for some applications. In one example, a mirror is placed at the virtual focal point and an optical beam is launched into one coupling lens in a coupling lens pair and detected as it exits the other couplings lens in the coupling lens pair. The various components (i.e., the V-groove array 250, the asymmetric lenslet array 200 and the substrate 280) may then be adjusted in order to maximize the coupling efficiency between the input and output coupling lenses in the coupling lens pair. This process may be performed for all or a selected number of the coupling lens pairs. For instance, it may be convenient to maximize the coupling efficiency for a coupling lens pair in the middle and at each end of the asymmetric lenslet array while positional adjustments are made. Once the components are properly aligned, they may be bonded with UV epoxy, for example. Additional details concerning this active alignment process is described below in connection with FIG. 10.

Figure 7:
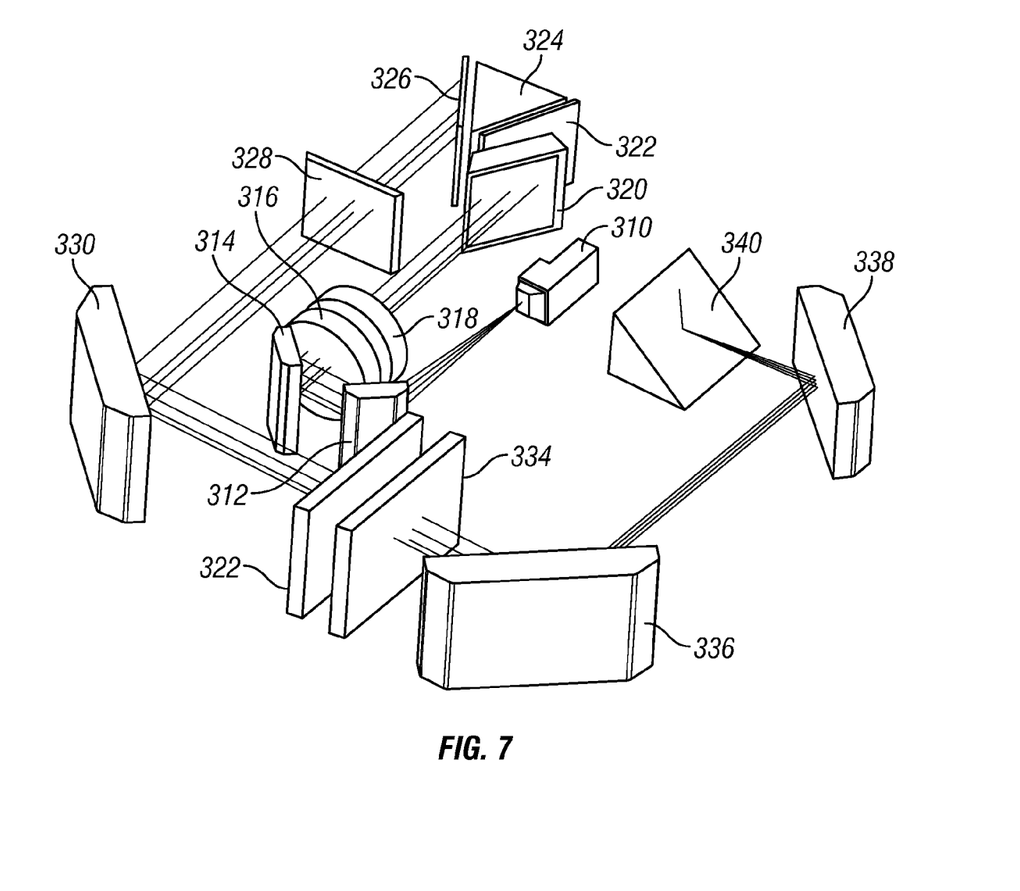
FIG. 7 shows another example of a wavelength blocker array that may use a launch optics arrangement of the type shown in FIGS. 5 and 6.
Figure 8:
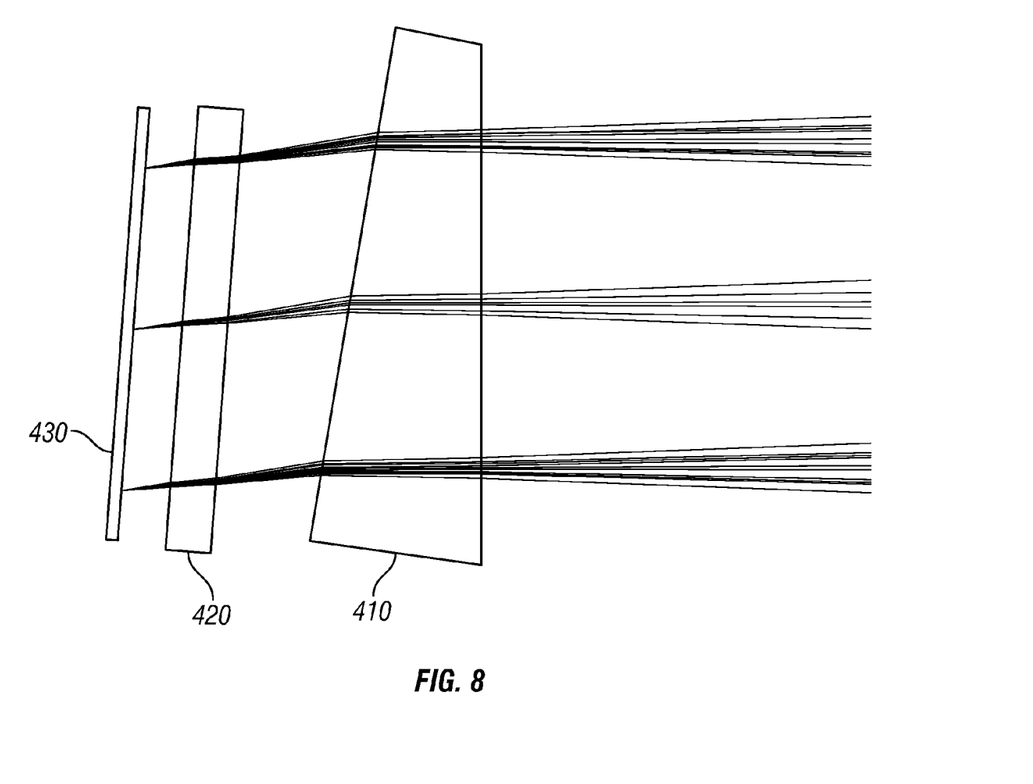
FIG. 8 shows a detail of the wavelength block array of FIG. 7 illustrating a compensating prism, window and DMD.

Another example of a wavelength blocker array that may use a launch optics arrangement of the type described above is shown in FIG. 7. In this particular example 15 1×1 wavelength blockers are formed using a single DMD. The launch optics arrangement thus includes 30 input/output fibers (or waveguides) secured in a v-groove array and an asymmetric lenslet array having 30 coupling lens and 15 collimating lens, each in registration with a pair of coupling lenses. As shown, the wavelength blocker array also includes launch optics 310 (as described above), turning mirrors 312 and 314, collimating lens pair 316 and 318, an expanding prism 320, diffraction gratings 322 and 326, turning prism 324, quarter waveplate 328, turning mirrors 330, 336 and 338, condenser lens doublet 332 and 334 and turning prism 340. Note that the turning prism 324 directs the optical beams to the compensating prism 410, window 420 and DMD 430 in FIG. 8. Additional details concerning the wavelength blocker array is described below in connection with FIG. 11.

The launch optics arrangement described above may also be used as a simple switch by placing one or more mirrors at the virtual focal point, with up to one mirror for each coupling lens pair. In one implementation the mirrors may be provided in the form of a DMD. By actuating the individual mirrors the optical communication path between the input and output can be switched on and off. Additional details concerning the use of this arrangement as a fiber array switch device is presented below in connection with FIG. 9.

FIG. 9 shows an example of a fiber array switch 500 which employs a micro lens array coupling element 510 (referred to above as an asymmetric lenslet array). The device consists of a fiber array 520, a double sided micro lens array 510, and a MEMs mirror array 530. The fiber array 520 is typically constructed by sandwiching fibers between two V-groove blocks. The fibers are spaced at a regular pitch. Common pitches are 125 or 250 um. The micro lens array in this design is a double sided array. There is a linear array of coupling lenses 540 on the side facing the fiber array. The coupling lenses 540 are equally spaced and have the same pitch as the fibers in the fiber array 520. The side facing the MEMS mirrors, consists of a linear array of combining lenses 550.

The pitch of the combining lenses 550 is double the pitch of the fibers in the fiber array. The final element is the linear array of MEMS mirrors 530.

The function of the switch 500 is to couple the light from one fiber to its neighbor. Light exiting fiber 1 is collimated by the coupling lens 540 on side 560 of the micro lens array 510. This beam passes thru the micro lens array 510 and is focused by the combining lens 550 on side 570 onto one of the MEMS mirrors in the MEMs mirror array 530. When the MEMS mirror is oriented normally, the beam will reflect off the MEMs mirrors back into the combining lens 550 where it will be recollimated and pass thru the micro lens array onto the neighboring coupling lens. This coupling lens then focuses the beam back onto fiber 2. In this way all of the fibers in the array are coupled in pairs. When the MEMS mirror is tilted away from the normal, the beam is dumped and no connection is made.

An array of 1×2 switches could be made with a micro lens array where the combiner couples 3 neighboring fibers.

Figure 10:
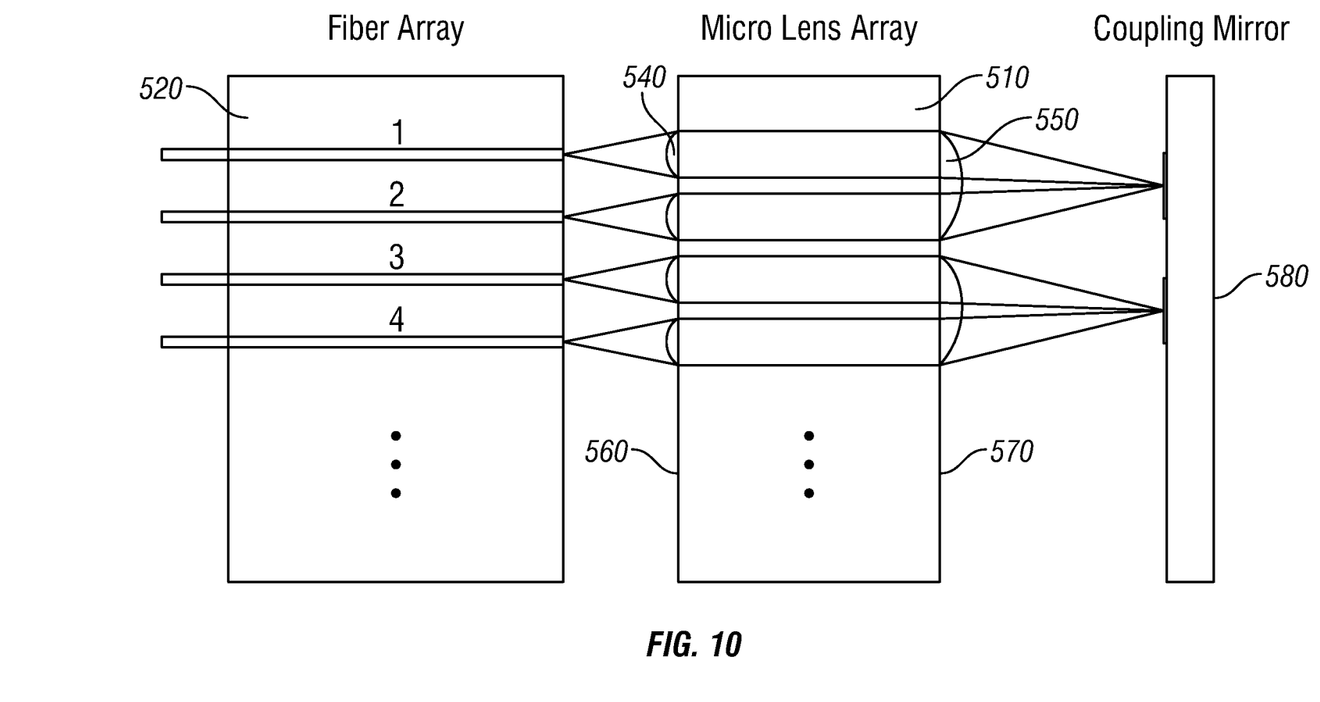
FIG. 10 shows a method for aligning a micro lens array to the fiber array using a coupling mirror located at the virtual image plane.

FIG. 3b shows a two component assembly where the micro lens array (referred to above as an asymmetric lenslet array) is bonded to a mounting surface on the fiber array. Proper functioning of the fiber array-micro lens array assembly depends on accurate alignment of the two components. FIG. 10 shows a method for aligning the micro lens array 510 to the fiber array 520 using a coupling mirror 580 located at the virtual image plane. When properly aligned, this configuration will efficiently couple the fibers in pairs across the entire fiber array 520. Light injected into fiber 1 will be efficiently coupled out of fiber 2 and so on across the array. To align the assembly, one simple monitors the coupling across the array while adjusting the alignment of the micro lens array 510 to the fiber array 520. When good coupling is achieved across the fiber array 520, the micro lens array 510 is bonded to the fiber array.

Figure 11A:
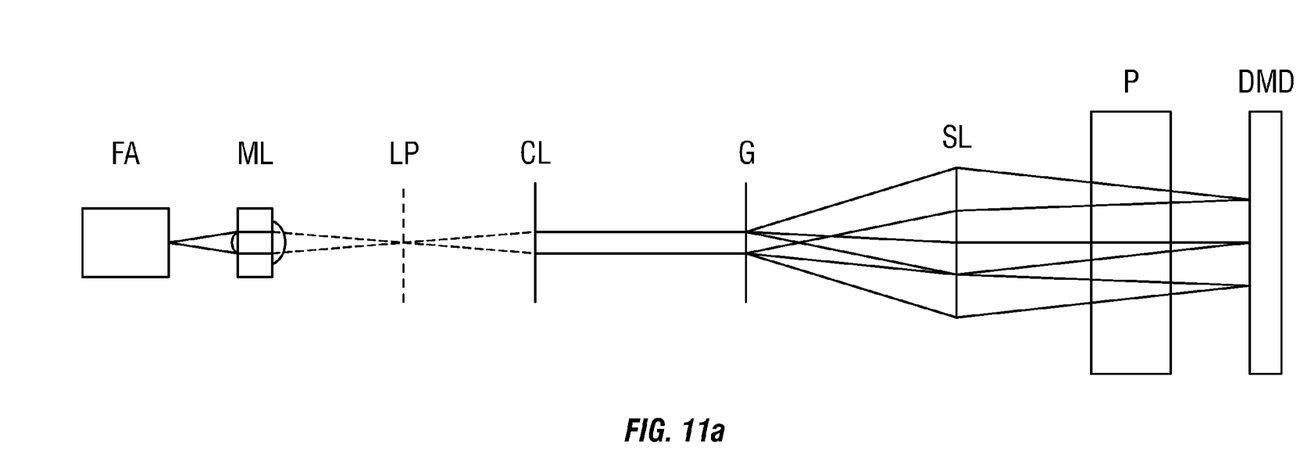
FIGS. 11a and 11b show a top view and side view, respectively, of one example of a 1×N wave blocker array which employs a launch optics arrangement as shown in FIGS. 5 and 6.
Figure 11B:
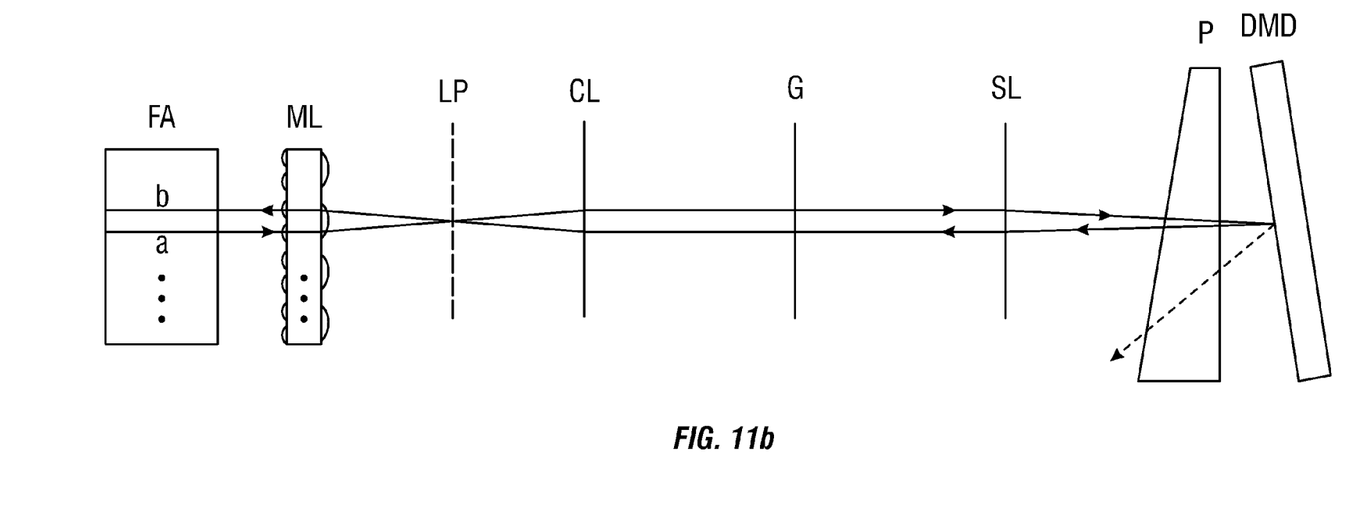

FIGS. 11a and 11b show a top view and side view, respectively, of one example of a 1×N wave blocker array which employs a fiber array-micro lens array launch optical arrangement as described above. The design consists of a linear fiber array (FA) followed by a double sided, micro lens array (ML) (i.e, the asymmetric lenslet assembly discussed above). The fiber array consists of 2N fibers sandwiched between V-groove plates. The exit face of the V-groove plate is often polished at an angle to prevent back reflections. The fibers in the array are equally spaced. Typical fiber spacing (pitch) is 125 or 250 microns. The micro lens array has a linear array of lenses on each side. The side facing the fiber array has 2N collimating lens, one for each fiber. These lenses are equally spaced having the same pitch as the fiber array. The side facing the DMD has a linear array of N coupling lenses having a pitch of twice the fiber pitch. This double sided micro lens array is designed to couple the light from adjacent fibers by overlapping their images at the launch plane (LP). The micro lens array is followed by a collimating lens (CL), a diffraction grating (G), a scan lens (SL), a compensating prism (P), and finally a MEMS micro mirror array here referred to as "DMD."

To understand the operation of the device, it is helpful to consider rays in top view and side view separately. The rays in the top view show the wavelength filtering operation of the device. Light exiting the fiber under consideration is collimated by a collimating lens on the front side of the microlens array. The collimated beam passes thru the micro lens array and is then focused by a coupling lens onto the "launch plane". The collimating lens recollimates this beam. The grating (G) then diffracts the collimated beam according to the grating equation. The scan lens (SL) focuses the spectrally dispersed beams onto the DMD mirror surface. If the DMD is set to pass a given wavelength, this beam will reflect off the DMD mirror and travel back thru the system to the neighboring exit fiber.

The side view shown in FIG. 11b shows how this coupling is achieved. This view shows the chief ray from the coupled pair of fibers. The ray exiting fiber "A" passes thru the system and focuses down onto the DMD. Because the DMD is tilted, this beam will reflect out of the system (dashed beam) unless the DMD mirrors are switch to the couple state. In the coupled state, the DMD mirrors are tilted up to reflect the beam nearly back onto itself (i.e. near Littrow condition). This beam then travels back thru the system to the micro lens array. However, due to the slight angular separation generated at the DMD, the coupling lens relays the beam to the neighboring collimating lens which focuses the beam on the neighboring fiber "B" and exits the system on this fiber.

Although the side view shows the operation of only one coupled fiber pair (port), the coupling described above occurs for all of the fiber pairs. Note, however, that because the DMD is tilted, the distance from the scan lens to the DMD varies from port to port. The function of the compensating prism (P) is to exactly correct this path length difference so that all ports come to a focus on the DMD.

Having described and illustrated the principles of our innovations in the detailed description and accompanying drawings, it will be recognized that the various embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of embodiments shown in software may be implemented in hardware and vice versa.

The invention claimed is:

1. An optical launch arrangement comprising:
   a fiber assembly for securing an array of optical fibers; and
   an asymmetric lenslet array having a first surface with a plurality of pairs of coupling lenses, each pair of the coupling lenses being in registration with a pair of optical fibers in the array of optical fibers, the asymmetric lenslet array having a second surface with a plurality of collimating lenses, each of the collimating lenses being in registration with one of the pairs of coupling lenses.

2. The optical launch arrangement of claim 1 wherein the fiber assembly includes a V-groove assembly for securing the optical fibers and a waveguide unit having a waveguide for each optical fiber in the array of optical fibers, each V-groove in the V-groove assembly being aligned with a core of one of the waveguides in the waveguide unit.

3. The optical launch arrangement of claim 2 wherein a pitch of the waveguides is equal to a pitch of the coupling lenses.

4. The optical launch arrangement of claim 1 further comprising a substrate on which the fiber assembly and the asymmetric lenslet array are mounted.

5. The optical launch arrangement of claim 2 wherein the second surface of the asymmetric lenslet array is angularly offset from an output surface of the waveguide unit.

6. The optical launch arrangement of claim 5 further comprising an antireflective coating formed on at least one of the first and second surfaces of the asymmetric lenslet array.

7. The optical launch arrangement of claim 1 wherein a distance between each collimating lens and the coupling lenses in registration therewith is about equal to a sum of a focal length of the respective collimating lens and a focal length of one of the coupling lenses.

8. The optical launch arrangement of claim 1 further comprising an optically transparent assembly on which the first and second surfaces of the asymmetric lenslet array are located.

9. The optical launch arrangement of claim 1 in which the coupling lenses in each pair are configured to be the same.

10. The optical launch arrangement of claim 1 in which the coupling lenses have different configurations.

11. The optical launch arrangement of claim 10 in which different coupling lenses have different refractive strengths in different axes.

12. An optical launch arrangement comprising:
a fiber assembly for securing an array of optical fibers; and
an asymmetric lenslet array having a first surface with a plurality of pairs of coupling lenses and a second surface with a plurality of collimating lenses, each of the collimating lenses being in registration with one of the pairs of coupling lenses, wherein each pair of coupling lenses is laterally offset from one of the optical fibers to spatially translate optical beams propagating in the optical fibers as the optical beams exit the asymmetric lenslet array.

13. An optical switch comprising:
a fiber assembly for securing an array of optical fibers;
an asymmetric lenslet array having a first surface with a plurality of pairs of coupling lenses, each pair of the coupling lenses being in registration with a pair of optical fibers in the array of optical fibers, the asymmetric lenslet array having a second surface with a plurality of combining lenses, each of the combining lenses being in registration with one of the pairs of coupling lenses; and
a MEMs mirror array, each of said MEMS mirrors being positioned to receive an optical beam from one of the combining lenses.

14. The optical switch of claim 13 wherein the fiber assembly includes a V-groove assembly for securing the optical fibers and a waveguide unit having a waveguide for each optical fiber in the array of optical fibers, each V-groove in the V-groove assembly being aligned with a core of one of the waveguides in the waveguide unit.

15. The optical switch of claim 14 wherein a pitch of the waveguides is equal to a pitch of the coupling lenses.

16. The optical switch of claim 13 further comprising a substrate on which the fiber assembly and the asymmetric lenslet array are mounted.

17. The optical switch of claim 14 wherein the second surface of the asymmetric lenslet array is angularly offset from an output surface of the waveguide unit.

18. The optical switch of claim 17 further comprising an antireflective coating formed on at least one of the first and second surfaces of the asymmetric lenslet array.

19. The optical switch of claim 13 wherein a distance between each combining lens and the coupling lenses in registration therewith is about equal to a sum of a focal length of the respective combining lens and a focal length of one of the coupling lenses.

20. The optical launch arrangement of claim 1 wherein the asymmetric lenslet array is oriented such that the first surface of the asymmetric lenslet array is disposed along an optical path between the fiber assembly and the second surface of the asymmetric lenslet array.

21. The optical launch arrangement of claim 12 wherein the asymmetric lenslet array is oriented such that the first surface of the asymmetric lenslet array is disposed along an optical path between the fiber assembly and the second surface of the asymmetric lenslet array.

22. The optical switch of claim 13 wherein the asymmetric lenslet array is oriented such that the first surface of the asymmetric lenslet array is disposed along an optical path between the fiber assembly and the second surface of the asymmetric lenslet array.

23. The optical launch arrangement of claim 1 wherein each of the coupling lenses are arranged to collimate an optical beam and direct the collimated optical beam to the collimating lens with which the coupling lens is in registration.

* * * * *